(12) United States Patent
Lubeck et al.

(10) Patent No.: US 9,074,871 B1
(45) Date of Patent: Jul. 7, 2015

(54) PIPE MEASURING SYSTEM

(71) Applicants: Steven M. Lubeck, Exton, PA (US);
Phillip L. Lawson, Midland, TX (US)

(72) Inventors: Steven M. Lubeck, Exton, PA (US);
Phillip L. Lawson, Midland, TX (US)

(*) Notice: Subject to any disclaimer, the term of this patent is extended or adjusted under 35 U.S.C. 154(b) by 121 days.

(21) Appl. No.: 13/943,749

(22) Filed: Jul. 16, 2013

Related U.S. Application Data (60) Provisional application No. 61/678,271, filed on Aug. 1, 2012.

(51) Int. Cl.
*G01B 11/26* (2006.01)
*G01B 11/02* (2006.01)

(52) U.S. Cl.
CPC ..................... *G01B 11/026* (2013.01)

(58) Field of Classification Search
CPC ...... G01B 11/043; G01B 11/02; G01B 11/04; G01B 11/00; G01B 11/026; G01B 11/028; G01B 5/0002; G01B 11/14; G01B 3/02; G01B 21/16; G03F 9/7088; G01C 3/00; G01C 15/00; G01C 3/02; G01C 1/00; A63B 57/00; A63B 71/0605; A63B 2024/0025; A63B 2220/836; A63B 2225/50; A63B 24/0021; A63B 69/00; A63B 71/06; G01J 3/50; G01J 5/08; G01F 23/58
USPC ........ 356/634, 625, 3, 138, 154, 6, 146, 4.01, 356/614, 11, 28, 400; 250/559.26, 252.1; 209/518, 524–525; 702/158, 155, 94, 702/97; 73/152.01, 1.79; 235/414, 411, 235/412; 382/106
See application file for complete search history.

(56) References Cited

U.S. PATENT DOCUMENTS

| | | | |
|---|---|---|---|
| 4,234,942 A | 11/1980 | Prause et al. | |
| 4,468,959 A | 9/1984 | Roberts | |
| 4,671,654 A | 6/1987 | Miyahara et al. | |
| 4,701,869 A * | 10/1987 | Callegari et al. | 702/158 |
| 5,008,555 A * | 4/1991 | Mundy | 250/559.22 |
| 5,202,680 A * | 4/1993 | Savage | 340/853.1 |
| 6,480,757 B1 * | 11/2002 | Susnjara | 700/159 |
| 6,593,587 B2 | 7/2003 | Pease | |
| 7,042,555 B1 | 5/2006 | Lawson | |
| 7,467,474 B1 * | 12/2008 | Statham | 33/286 |

(Continued)

OTHER PUBLICATIONS https://www.youtube.com/watch?v=3St2SYmENwg, published on May 13, 2013 by one of the inventors of the instant application.*

(Continued)

*Primary Examiner* — Tarifur Chowdhury
*Assistant Examiner* — Mohamed Amara
(74) *Attorney, Agent, or Firm* — Robert J. Harter (57) ABSTRACT

A pipe measuring system provides means for tallying a set of pipes, each of which has a threaded coupling at one end. The system includes a handheld laser instrument and target that are manually and sequentially placed at opposite ends of each pipe to measure its length. However, to measure the pipe's effective assembled length, rather than its actual length, the laser instrument has an adjustable backstop for engaging one end of the pipe. To use the system, a manufacture of the pipe first provides a specified make-up dimension that says how far the coupling should overlap the pipe when properly tightened. A manufacturer and/or end-user of the laser instrument establish the instrument with a zero reference. Then, based on the pipe manufacturer's specified make-up dimension and the location of the zero reference, the end-user adjusts the position of the backstop to be a certain distance from the zero reference.

20 Claims, 6 Drawing Sheets

(56) References Cited

U.S. PATENT DOCUMENTS

| | | | |
|---|---|---|---|
| 8,684,632 B2* | 4/2014 | Grover | 405/232 |
| 9,016,386 B2* | 4/2015 | Flusche | 166/381 |
| 2009/0073405 A1* | 3/2009 | Kanaya | 355/53 |
| 2012/0050723 A1* | 3/2012 | Emtman et al. | 356/123 |
| 2013/0276316 A1* | 10/2013 | Carrell | 33/290 |

OTHER PUBLICATIONS

DIGI-TALLY; Laser Pipe Tally System; Published in US at www.digi-tally.com on approximately Nov. 2011 by Phillip Lawson; pp. 1-4.

* cited by examiner

PIPE MEASURING SYSTEM

CROSS REFERENCE TO RELATED APPLICATIONS

This application claims the benefit of provisional patent application Ser. No. 61/678,271 filed on Aug. 1, 2012.

FIELD OF THE DISCLOSURE

The subject invention generally pertains to measuring the length of pipe and specifically to measuring pipes used in well fields.

BACKGROUND

Oil wells and wells for other fluids typically comprise a string of tubing surrounded by a well casing. The well casing is what lines the wellbore and usually comprises a long string of relatively large diameter pipe interconnected by internally threaded couplings known as collars. Casings generally define the overall diameter and depth of a wellbore. Well tubing has a much smaller diameter for fitting down inside the casing. Tubing typically comprises a long string of pipe sections whose threaded ends are also interconnected by threaded couplings. The tubing provides a conduit for conveying oil or some other fluid to the surface of the well. Usually a submerged reciprocating pump is attached to the lower end of the tubing to draw the fluid from the annulus between the inside diameter of the casing and the outside diameter of the tubing, and to force the fluid up through the tubing to the surface. To operate the pump, a string of sucker rods extends through the tubing to serve as a long reciprocating connecting rod that couples the submerged pump to a reciprocating drive unit at ground level.

Measuring the length of each casing or tubing segment before installing it down a wellbore can help establish a record of the pipe string's final overall length. This can be accomplished by simply using a tape measure to measure each joint (i.e., measure the length of a pipe segment plus one coupling attached to it) and then recording and summing the readings manually (i.e., manually tallying the readings). To minimize human error, electronic measuring systems have been developed, such as the one disclosed in U.S. Pat. No. 7,042,555, which is specifically incorporated by reference herein.

DETAILED DESCRIPTION

FIGS. 1-12 show a pipe tallying system 15 and method of using a handheld portable laser instrument 10 for measuring and tallying a plurality of threaded pipe. Tallying pipe refers to measuring the effective lengths of individual pipes of a disassembled set of pipes and summing those lengths to predict the set's overall length when the individual pipes are coupled end-to-end. An individual pipe's effective length equals its overall length (with a threaded collar screwed thereon) minus the axial overlap between the pipe and the collar. The term, "axial" refers to a direction generally parallel to the pipe's length and/or parallel to a beam 12 projected from laser instrument 10. The term, "radial" refers to a direction generally perpendicular to the pipe's length and/or perpendicular to beam 12.

In some examples, the term, "threaded pipe" refers to a pipe with threads at each end and an internally threaded collar 14 or coupling screwed onto one end of the pipe. Some examples of threaded pipe have threads at each end without a coupling at either end. Some examples of threaded pipe are an assembly comprising two or three shorter pipes interconnected by one or more intermediate collars 14 to create one longer pipe.

Example pipe tallying systems and methods disclosed herein provide convenient means for factoring in a manufacturer's specified make-up dimension. The specified make-up dimension is the resulting collar-to-pipe axial overlap at each threaded joint when the collars are properly tightened. By knowing the specified make-up dimension beforehand, one can readily tally a plurality of threaded pipe and accurately predict its overall assembled length by incorporating the specified make-up dimension with the use of laser instrument 10.

The term, "laser instrument" refers to any laser-based measuring device and its associated components. Examples of associated components include, but are not limited to, an enclosure 16, supporting structure (e.g., a handle 18, a frame, a bracket, a V-block 20, a connector, etc.), and electronic circuitry 22 (schematically illustrated). In some examples, electronic circuitry 22 provides various functions, examples of which include, but are not limited to, controlling laser instrument 10, computing, calculating, processing signals, storing data, converting length measurements, summing length measurements, calibrating laser instrument 10, and establishing a zero reference 24 of laser instrument 10. In some examples, all or part of electronic circuitry 22 is an integral part of laser instrument 10 and is contained within enclosure 16. In some examples, all or part of electronic circuitry 22 is outside of enclosure 16 and a hardwired or wireless communication link connects circuitry 22 in electronic communication with other parts of laser instrument 10. Specific examples of the laser generating component of laser instrument 10 include, but are not limited to, "DISTO Memo," "DISTO Pro" or a "DISTO Pro-A," which are laser measurement devices of Leica Geosystems AG, of Heerbrugg, Switzerland.

Figure 7:
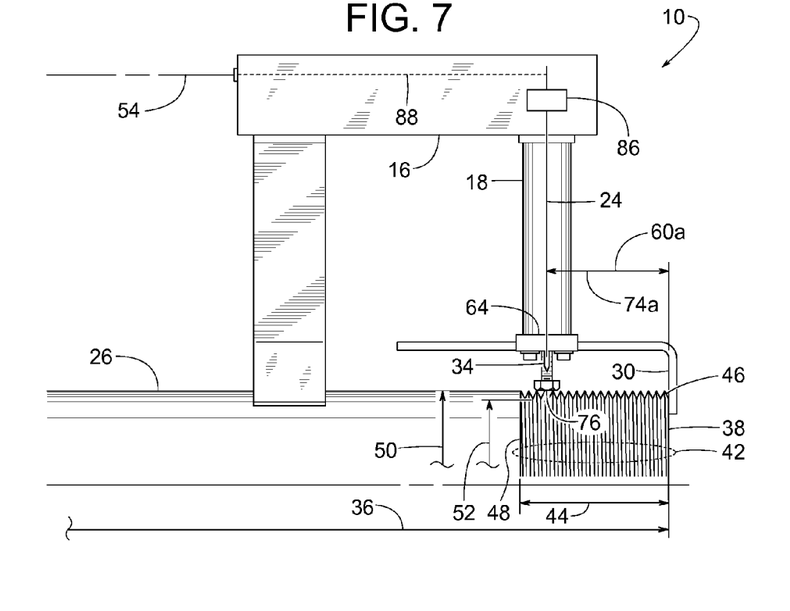
FIG. 7 is a side view similar to FIG. 3 but showing the laser instrument placed against a threaded pipe.

In some examples, pipe tallying system 15 comprises a threaded pipe 26 (e.g., pipes 26a and 26b), laser instrument 10 with zero reference 24, a portable hand-held target 28, a backstop 30, a ruler 32 and a visual indicator 34. In the illustrated example, threaded pipe 26 has an overall length 36 extending axially from a proximal axial end 38 of pipe 26 to a distal axial end 40 of pipe 26. Each end of the pipe itself has a threaded section 42 extending over a certain axial length 44. The expression, "threaded section extending over a certain axial length" means that the total overall length of the threaded section, from beginning to end, from a first partial or complete thread 46 to a last partial or complete thread 48, is equal to the certain axial length. Such a threaded section is not merely a segment or subset of threads within a larger run or larger continuous set of threads. The threads can be of any type, examples of which include, but are not limited to, NPT (National Pipe Thread-Tapered), NPS (National Pipe Thread-Straight), buttress thread, rounded threaded, VAM TOP thread (VAM is a registered trademark of the Vallourec Group, of Boulogne, France). In any case, threaded section 42 has peak outer diameter 50 and a root diameter 52, as shown in FIG. 7.

Figure 1:
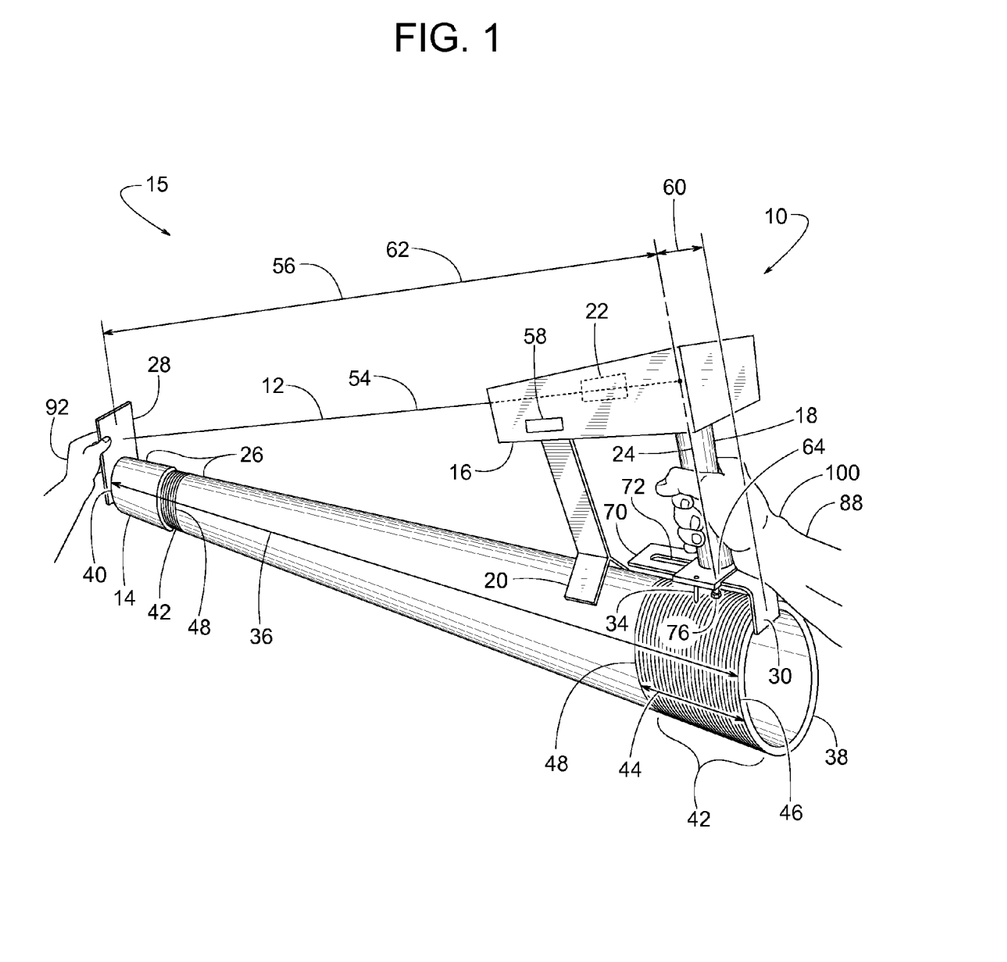
FIG. 1 is a perspective view of a pipe tallying system based on the teachings disclosed herein.
Figure 9:
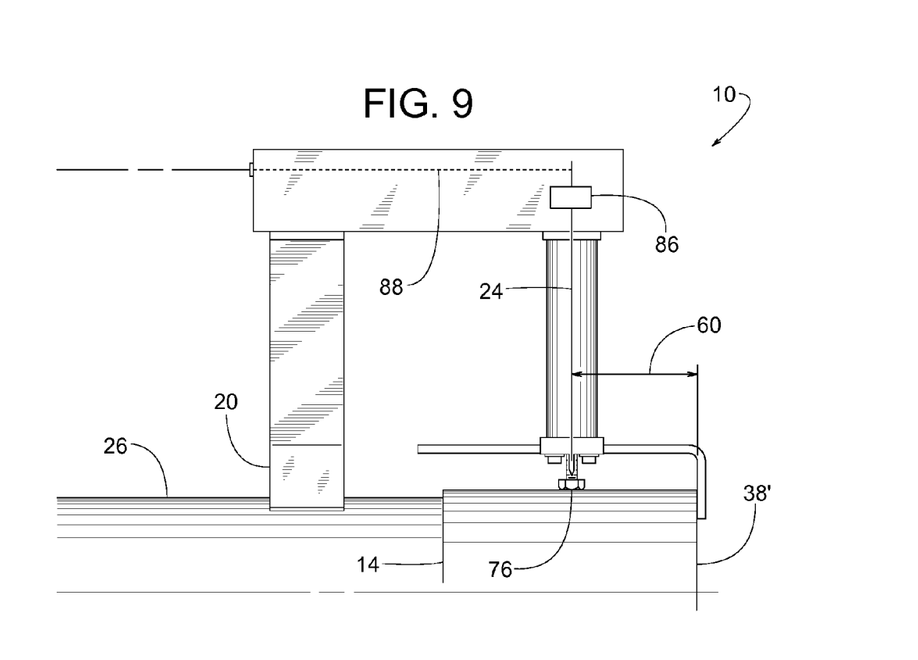
FIG. 9 is a side view similar to FIG. 7 but showing part of the laser instrument resting upon a coupling.
Figure 11:
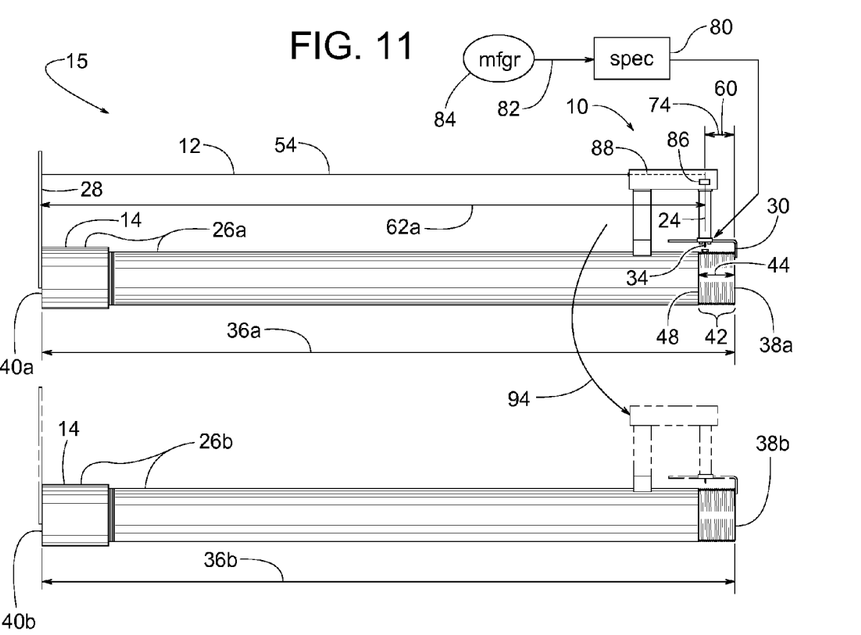
FIG. 11 is a side view showing the pipe tallying system measuring a first pipe.

Overall length 36 of threaded pipe 26, in some examples, encompasses the axial extension of a screwed-on internally threaded collar 14. FIGS. 1 and 11 show collar 14 and target 28 at the pipe's distal axial end 40 while laser instrument 10 is at proximal axial end 38. Alternatively, FIG. 9 shows collar 14 at a proximal axial end 38' while laser instrument 10 and target 28 would still be at proximal axial end 38' and a distal axial end, respectively.

Target 28 is schematically illustrated to represent any surface (e.g., a relatively flat, stiff card) that can be aligned with distal axial end 40 and intersect a centerline 54 of a laser beam 12 emitted from laser instrument 10 for the purpose of measuring a chosen distance 56 from the laser instrument's zero reference 24 to target 28. Zero reference 24 is defined such that when target 28 is placed a predetermined distance in front of zero reference 24, laser instrument 10 provides a measurement reading 58 (schematically illustrated) substantially equal to the predetermine distance. For example, if target 28 is placed ten feet from zero reference 24, measurement reading 58 substantially equals ten feet. Measurement reading 58 is a value determined, stored, displayed, converted, calculated and/or otherwise processed by laser instrument 10. For instance, in some examples, measurement reading 58 is displayed. In some examples, measurement reading 58 is not displayed. In some examples, measurement reading 58 is converted to another value.

In some examples, measurement reading 58 is less than the threaded pipe's overall length 36 due to backstop 30 being an offset distance 60 from the laser instrument's zero reference 24. The position of backstop 30 is adjusted so that offset distance 60 equals the axial overlap between collar 14 and the pipe of threaded pipe 26. In some examples, measurement reading 58 equals the pipe's overall length 36 minus offset distance 60, and thus measurement reading 58 reflects an effective pipe length 62 of threaded pipe 26.

Figure 3:
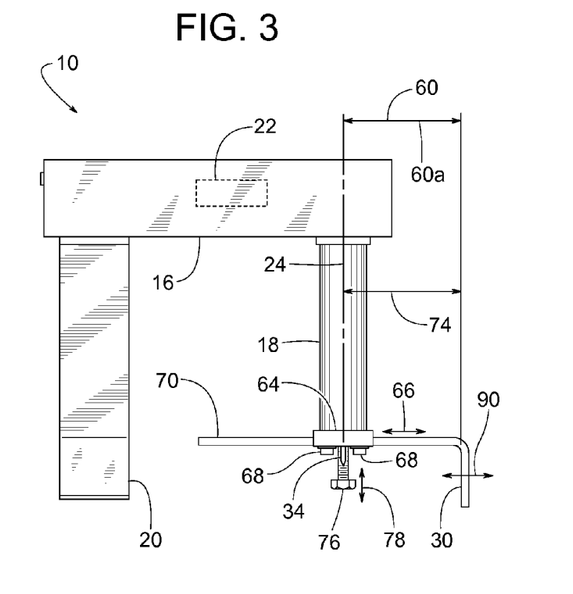
FIG. 3 is a side view of the laser instrument shown in FIG. 2.
Figure 4:
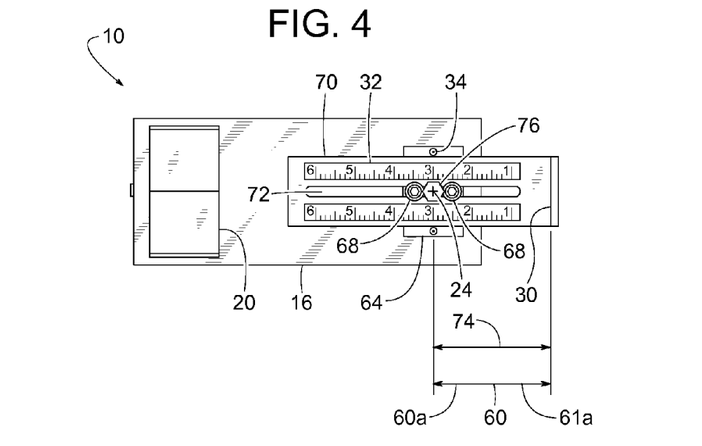
FIG. 4 is a bottom view of the laser instrument shown in FIG. 3.
Figure 5:
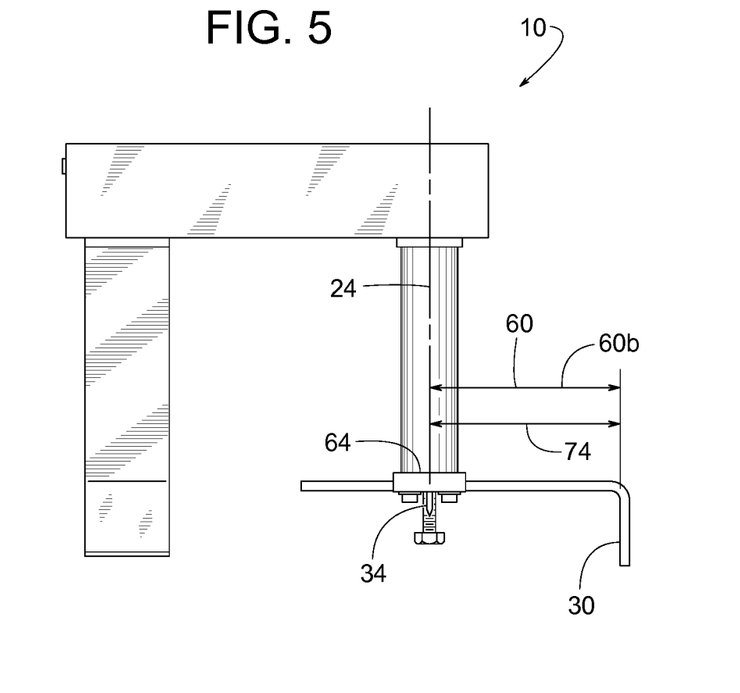
FIG. 5 is a side view similar to FIG. 3 but showing the laser instrument's backstop adjusted to a different position.
Figure 6:
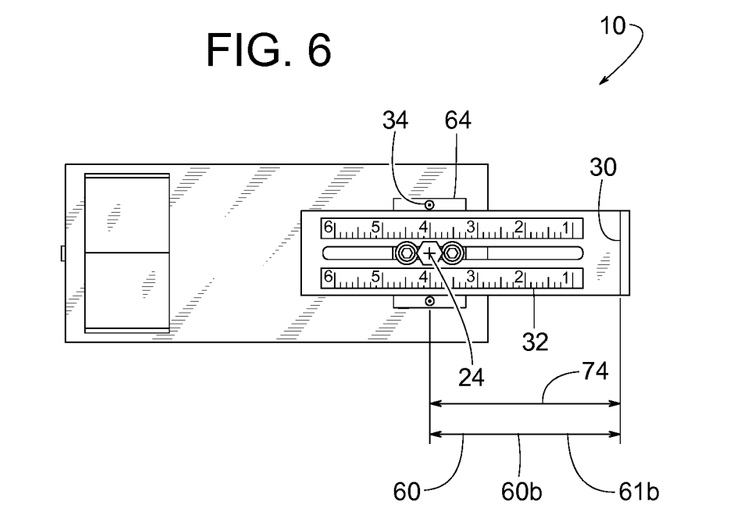
FIG. 6 is a bottom view of the laser instrument shown in FIG. 6.
Figure 8:
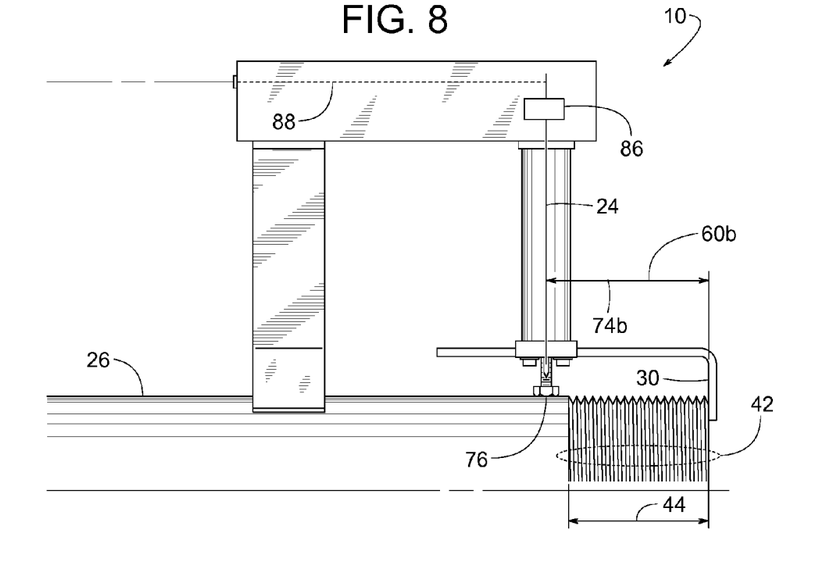
FIG. 8 is a side view similar to FIG. 7 but showing the backstop at the position shown in FIGS. 5 and 6.

Backstop 30 is coupled to laser instrument 10 by any one of various means. For instance, in some examples, handle 18 connects a guide block 64 to enclosure 16, and backstop 30 slides in an axial direction 66 within guide block 64 to adjust offset distance 60. Once adjusted to the desired location, screws 68 hold backstop 30 in place by clamping a ruler-supporting portion 70 of backstop 30 to guide block 64. When screws 68 are loosened, backstop 30 and its ruler-supporting portion 70 can be manually slid in an axial direction as a slot 72 in ruler-supporting portion 70 accommodate the screw's sliding motion relative to the backstop's ruler-supporting portion 70. FIGS. 3, 4 and 7 show backstop 30 being a first offset distance 60a (e.g., three inches) from zero reference 24 when backstop 30 is at a first adjusted position. FIGS. 5, 6 and 8 show backstop 30 being at a second offset distance 60b (e.g., four inches) from zero reference 24 when backstop 30 is at a second adjusted position.

Ruler 32 is coupled to backstop 30 (or to laser instrument 10) such that ruler 32 remains substantially stationary relative to backstop 30 (or to laser instrument 10) as backstop 30 moves between the first adjusted position (FIGS. 3, 4 and 7) and the second adjusted position (FIGS. 5, 6 and 8). In the illustrated example, ruler 32 remains substantially stationary relative to backstop 30 such that the two move as a unit as the backstop's position is adjusted. The term, "ruler" refers to a display of any dimensional scale, wherein the dimensional scale can be provided by various means, examples of which include, but are not limited to, printed, embossed, etched, engraved, etc.

Visual indicator 34 with reference to ruler 32 indicates the dimension of the offset distance 60 between backstop 30 and zero reference 24. FIG. 4, for example, shows visual indicator 34 indicating that first offset distance 60a is a first dimension 61a of three inches, whereby backstop 30 is spaced axially three inches from zero reference 24. FIG. 6 shows visual indicator 34 indicating that second offset distance 60b is a second dimension 61b of four inches, whereby backstop 30 is spaced axially four inches from zero reference 24. In the illustrated example, visual indicator 34 is a pointed pin attached to guide block 64. Visual indicator 34 serves two purposes: 1) as a pointer to ruler 32, and 2) as a pointer to adjacent threaded section 42 and/or to other relevant features or marks of threaded pipe 26.

Depending on the type of pipe thread and/or collar design, a manufacturer who designed, created or otherwise processed threaded pipe 26 and its collar 14 specifies a certain specified make-up dimension 74 (FIG. 11), which should be achieved at each joint of a properly assembled and properly tightened string of pipe. In some examples, as shown in FIG. 7, a specified make-up dimension 74a is significantly less than the certain axial length 44 of threaded section 42. In some examples, as shown in FIG. 8, a specified make-up dimension 74b is significantly greater than the certain axial length 44 of threaded section 42. Consequently, the threaded section's axial length 44 often is not a good indicator of the manufacturer's specified make-up dimension 74 (e.g., make-up dimension 74a or 74b).

In some examples, V-block 20 supports and aligns a forward end of laser instrument 10 relative to threaded pipe 26. To help aim laser beam 12 at target 28, particularly in the radial direction, some examples of system 15 include an adjustable support surface 76 that is adjustably movable in a radial direction 78 relative to laser instrument 10. In some examples, adjustable support surface 76 is the head of a screw that slips through slot 72 and is screwed an adjustable radial distance into guide block 64. Adjustable support surface 76, in some examples, engages the threaded section's peak outer diameter 50 while being spaced apart from root diameter 52. This allows surface 76 and consequently backstop 30 to be infinitely adjustable in an axial direction independent of discrete axial locations of thread roots.

Figure 10:
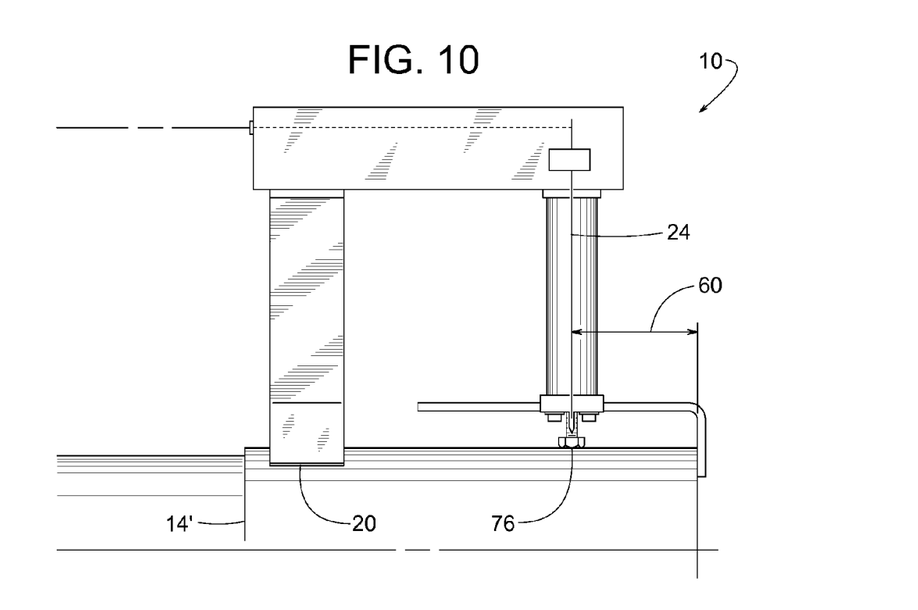
FIG. 10 is a side view similar to FIG. 10 but showing the entire laser instrument resting upon a coupling.

In some examples, adjustable support surface 76 rests upon the peaks of threaded section 42, as shown in FIGS. 1 and 7. In some examples, adjustable support surface 76 rests upon a non-threaded portion of threaded pipe 26, as shown in FIG. 8. In some examples, adjustable support surface 76 rests upon a collar 14 while V-block 20 straddles the pipe portion of threaded pipe 26, as shown in FIG. 9. In some examples, adjustable support surface 76 and V-block 20 both rest upon collar 14', as shown in FIG. 10.

Figure 2:
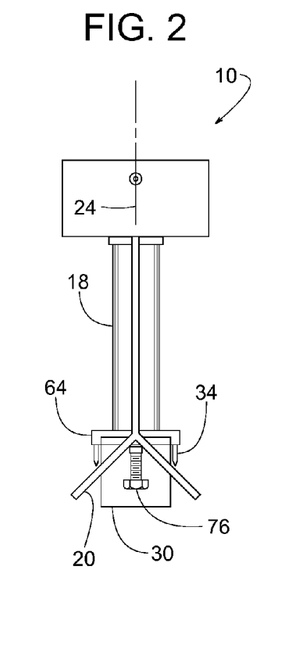
FIG. 2 is a front view of an example laser instrument shown in FIG. 1.
Figure 12:
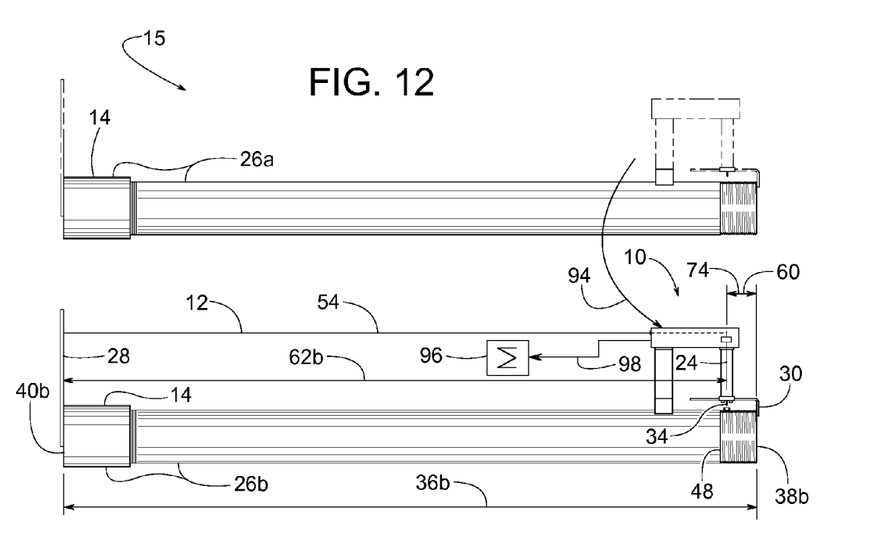
FIG. 12 is a side view showing the pipe tallying system measuring a second pipe.

In some examples, with further reference to FIGS. 11 and 12, system 15 is used in a method for tallying pipe that includes at least a first threaded pipe 26a and a second threaded pipe 26b each having specified make-up dimension 74. In this example, first threaded pipe 26a has a first overall length 36a from a first proximal axial end 38a to a first distal axial end 40a, and the second threaded pipe 26b has a second overall length 36b extending from a second proximal axial end 38b to a second distal axial end 40b. In some examples, the method for tallying pipe is performed and illustrated as follows:

Block 80 and arrow 82 of FIG. 11 represent manufacturer 84 specifying the specified make-up dimension 74. In this example, the threaded section's certain axial length 44 is greater than the specified make-up dimension 74. Block 86 and a line 88 of FIGS. 7 and 11 represent establishing zero reference 24 of laser instrument 10 with respect to housing 16, guide block 64, visual indicator 34, handle 18 and/or some other fixed feature of laser instrument 10. Zero reference 24, in some examples, is an inherent feature of laser instrument 10 and is established initially by a manufacturer of laser instrument 10. In some examples, the laser instrument manufacturer provides means for an end user 88 of laser instrument 10 to subsequently calibrate or adjust the virtual or actual position of zero reference 24, whereby end user 88 contributes in establishing zero reference 24. Arrow 90 of FIG. 3 represents adjusting backstop 30 relative to laser instrument 10 such that offset distance 60 between backstop 30 and zero reference 24 substantially equals the specified make-up dimension 74. In some examples, end user 88 adjusts backstop 30 after the laser instrument manufacturer and/or end user 88 establishes zero reference 24. Visual indicator 34 protruding from guide block 64, as shown in FIGS. 3 and 4 represents providing visual indicator 34 in substantial alignment with zero reference 24, wherein visual indicator 34 is at an adjustable distance from backstop 30, and the adjustable distance is substantially equal to the offset distance 60 between backstop 30 and zero reference 24. Ruler 32 being attached in sliding engagement with guide block 64, as shown in FIGS. 2-4, represents coupling ruler 32 to laser instrument 10 or backstop 30 such that visual indicator 34 with reference to ruler 32 indicates a value of the offset distance 60 between backstop 30 and zero reference 24.

The upper half of FIG. 11 illustrates placing backstop 30 up against first proximal axial end 38a of first threaded pipe 26a such that visual indicator 34 is appreciably spaced apart from the threaded section's last thread 48, is appreciably spaced apart from the first proximal axial end 38a, and is appreciably spaced apart from the first distal axial end 40a. The upper half of FIG. 11 with further reference to a left hand 92 in FIG. 1 illustrates placing target 28 up against the first distal axial end 40a of the first threaded pipe 26a. The upper half of FIG. 11 also shows laser instrument 10 measuring first effective pipe length 62a of first threaded pipe 26a by projecting laser beam 12 from laser instrument 10 to target 28 while target 28 and backstop 30 are engaging the first threaded pipe 26a. FIG. 11 further shows the first effective pipe length 62a equals a first distance 56a from zero reference 24 to target 28 when backstop 30 is up against the first proximal axial end 38a and target 28 is up against the first distal axial end 40a, and the first effective pipe length 62a is substantially equal to the first overall length 36a minus the specified make-up dimension 74. Arrow 94, shown in FIGS. 11 and 12, represent manually moving laser instrument 10 from threaded pipe 26a to threaded pipe 26b.

The lower half of FIG. 12 illustrates placing backstop 30 up against second proximal axial end 38b of second threaded pipe 26b such that visual indicator 34 is appreciably spaced apart from the threaded section's last thread 48, is appreciably spaced apart from the second proximal axial end 38b, and is appreciably spaced apart from the second distal axial end 40b. The lower half of FIG. 12 with further reference to left hand 92 in FIG. 1 illustrates placing target 28 up against the second distal axial end 40b of the second threaded pipe 26b. The lower half of FIG. 12 also shows laser instrument 10 measuring second effective pipe length 62b of second threaded pipe 26b by projecting laser beam 12 from laser instrument 10 to target 28 while target 28 and backstop 30 are engaging the second threaded pipe 26b. FIG. 12 further shows the second effective pipe length 62b is a second distance 56b from zero reference 24 to target 28 when backstop 30 is up against the second proximal axial end 38b and target 28 is up against the second distal axial end 40b, and the second effective pipe length 62b is substantially equal to the second overall length 36b minus the specified make-up dimension 74. Block 96 and arrow 98 of FIG. 12 represents laser instrument 10 (e.g., its associated electronic circuitry 22, such as a computer) adding the second effective pipe length 62b to the first effective pipe length 62a to predict the total length of a resulting pipe string assembled by joining pipes 26a and 26b.

For further clarification, a plurality of threaded pipes 26 when assembled to create a pipe string represent any type of pipe that may be associated with a wellbore. Examples of such pipes include, but are not limited to, well casings, tubing, and drill pipe. FIGS. 11 and 12 illustrate a method for measuring and tallying the individual lengths of a group of threaded pipes, wherein each threaded pipe, in the illustrated example, comprises a pipe and a coupling. The lengths of each threaded pipe can then be tallied and summed to provide an anticipated overall length of a pipe string that could be created by interconnecting the group of threaded pipes. Although the method may involve any number of threaded pipes, only two are shown for simplicity. The term, "handheld" as it pertains to the handheld laser instrument 10 refers to a portable laser instrument that can be readily carried in one hand (e.g., a right hand 100, as shown in FIG. 1), and more specifically refers to a portable laser instrument that has a volume of less than one cubic foot and a mass of less than twenty-five pounds. Some examples of laser instrument 10 include or are connected to a computer using an appropriate data cable, such as a DISTO GEV102-1 (725078), a DISTO data cable (708175), or a conventional commercially available zero-modem cable. Downloading the data from laser instrument 10 to a computer can be facilitated by using software that Leica Geosystems provides with their DISTO laser devices. The software allows the data to be imported into a Microsoft Excel spreadsheet.

Although certain example methods, apparatus and articles of manufacture have been described herein, the scope of the coverage of this patent is not limited to these. Rather, this patent covers all methods, apparatus and articles of manufacture fairly falling within the scope of the appended claims either literally or under the doctrine of equivalents.

The invention claimed is:

1. A pipe tallying system, comprising:
   a threaded pipe having an overall length extending axially from a proximal axial end of the threaded pipe to a distal axial end of the threaded pipe, the overall length encompassing a screwed-on collar having internal threads, the screwed-on collar being at one of the proximal axial end and the distal axial end;
   a laser instrument being proximate the proximal axial end of the threaded pipe, the laser instrument projecting a beam in an axial direction along a centerline of the beam substantially parallel to the threaded pipe, the laser instrument defining a zero reference spaced axially apart from the proximal axial end of the threaded pipe;

a target engaging the distal axial end of the threaded pipe, the target intersecting the centerline of the beam and being at a chosen distance from the zero reference of the laser instrument;

a measurement reading of the laser instrument, the measurement reading indicating an effective pipe length from the zero reference to the target, the measurement reading being less than the overall length of the threaded pipe;

a backstop coupled to the laser instrument, the backstop being movable in the axial direction relative to the laser instrument, the backstop being movable selectively to a first adjusted position and a second adjusted position, the backstop being a first offset distance from the zero reference when the backstop is at the first adjusted position, the backstop being a second offset distance from the zero reference when the backstop is at the second adjusted position, the measurement reading being disregarding and independent of the first offset distance, the measurement reading being disregarding and independent of the second offset distance;

a ruler coupled to at least one of the backstop and the laser instrument such that the ruler remains substantially stationary relative to one of the backstop and the laser instrument as the backstop moves between the first adjusted position and the second adjusted position; and a visual indicator proximate the ruler and being substantially stationary relative to one of the backstop and the laser instrument as the backstop moves between the first adjusted position and the second adjusted position, the visual indicator being movable in the axial direction relative to the ruler, the visual indicator with reference to the ruler indicating a first dimension of the first offset distance, the visual indicator with reference to the ruler indicating a second dimension of the second offset distance.

2. The pipe tallying system of claim 1, wherein the threaded pipe has a threaded section extending over a certain axial length that is greater than the first offset distance.

3. The pipe tallying system of claim 1, wherein the threaded pipe has a threaded section extending over a certain axial length that is less than the first offset distance.

4. The pipe tallying system of claim 1, wherein the backstop is connected to the ruler such that while the backstop moves between the first adjusted position and the second adjusted position, the backstop and the ruler move as a unit relative to the laser instrument.

5. The pipe tallying system of claim 1, wherein the threaded pipe includes a threaded section having a peak outer diameter and a root diameter, and the pipe tallying system further comprising an adjustable support surface being adjustably movable in a radial direction relative to the laser instrument wherein the radial direction is substantially perpendicular to the threaded pipe, the adjustable support surface engaging the peak outer diameter of the threaded section while being spaced apart from the root diameter.

6. A method for tallying pipe including a first threaded pipe and a second threaded pipe each having a specified make-up dimension, the first threaded pipe having a first overall length from a first proximal axial end of the first threaded pipe to a first distal axial end of the first threaded pipe, the second threaded pipe having a second overall length extending from a second proximal axial end of the second threaded pipe to a second distal axial end of the second threaded pipe, the method comprising:

establishing a zero reference of a laser instrument;

adjusting a backstop relative to the laser instrument such that an offset distance between the backstop and the zero reference substantially equals the specified make-up dimension;

placing the backstop up against the first proximal axial end of the first threaded pipe;

placing a target up against the first distal axial end of the first threaded pipe;

projecting a laser beam from the laser instrument to the target while the target and the backstop are engaging the first threaded pipe;

by projecting the laser beam from the laser instrument to the target while the target and the backstop are engaging the first threaded pipe, measuring a first effective pipe length of the first threaded pipe, wherein the first effective pipe length is a first distance from the zero reference to the target when the backstop is up against the first proximal axial end and the target is up against the first distal axial end, and the first effective pipe length being substantially equal to the first overall length minus the specified make-up dimension;

placing the backstop up against the second proximal axial end of the second threaded pipe;

placing the target up against the second distal axial end of the second threaded pipe;

projecting the laser beam from the laser instrument to the target while the target and the backstop are engaging the second threaded pipe;

by projecting the laser beam from the laser instrument to the target while the target and the backstop are engaging the second threaded pipe, measuring a second effective pipe length of the second threaded pipe, wherein the second effective pipe length is a second distance from the zero reference to the target when the backstop is up against the second proximal axial end and the target is up against the second distal axial end, and the second effective pipe length being substantially equal to the second overall length minus the specified make-up dimension; and adding the second effective pipe length to the first effective pipe length.

7. The method of claim 6, wherein the first threaded pipe includes a collar with internal threads, and one of the first proximal axial end and the first distal axial end being on the collar.

8. The method of claim 6, further comprising a manufacturer of the first threaded pipe specifying the specified make-up dimension.

9. The method of claim 6, wherein the first threaded pipe has a threaded section extending over a certain axial length that is greater than the specified make-up dimension.

10. The method of claim 6, wherein the first threaded pipe has a threaded section extending over a certain axial length that is less than the specified make-up dimension.

11. The method of claim 6, further comprising providing a visual indicator in substantial alignment with the zero reference, the visual indicator being at an adjustable distance from the backstop, wherein the adjustable distance is substantially equal to the offset distance between the backstop and the zero reference.

12. The method of claim 6, further comprising coupling a ruler to at least one of the laser instrument and the backstop, and the ruler indicating a value of the offset distance between the backstop and the zero reference.

13. The method of claim 6, wherein the backstop is connected to a ruler such that while adjusting the backstop relative to the laser instrument, the backstop and the ruler move as a unit relative to the laser instrument.

14. The method of claim 6, wherein the first threaded pipe includes a threaded section having a peak outer diameter and a root diameter, and the method for tallying pipe further comprising adjusting an adjustable support surface by moving the adjustable support surface relative to the laser instrument, the adjustable support surface engaging the peak outer diameter of the threaded section while being spaced apart from the root diameter.

15. A method for tallying pipe including a threaded pipe processed by a manufacture, the threaded pipe having an overall length from a proximal axial end of the threaded pipe to a distal axial end of the threaded pipe, the overall length encompassing a screwed-on collar having internal threads, the screwed-on collar being at one of the proximal axial end and the distal axial end, the method comprising:

the manufacturer specifying a specified make-up dimension;

the threaded pipe having a threaded section extending over a certain axial length from a first thread to a last thread, the first thread being adjacent to at least one of the proximal end and the distal end, the last thread being between the proximal end and the distal end, the certain axial length being unequal to the specified make-up dimension;

establishing a zero reference of a laser instrument;

adjusting a backstop relative to the laser instrument such that an offset distance between the backstop and the zero reference substantially equals the specified make-up dimension;

providing a visual indicator in substantial alignment with the zero reference, the visual indicator being at an adjustable distance from the backstop, wherein the adjustable distance is substantially equal to the offset distance between the backstop and the zero reference;

coupling a ruler to at least one of the laser instrument and the backstop such that the visual indicator with reference to the ruler indicates a value of the offset distance between the backstop and the zero reference;

placing the backstop up against the proximal axial end of the threaded pipe such that the visual indicator is appreciably spaced apart from the last thread of the threaded section, is appreciably spaced apart from the proximal axial end, and is appreciably spaced apart from the distal axial end;

placing a target up against the distal axial end of the threaded pipe;

projecting a laser beam from the laser instrument to the target while the target and the backstop are engaging the threaded pipe; and by projecting the laser beam from the laser instrument to the target while the target and the backstop are engaging the threaded pipe, measuring an effective pipe length of the threaded pipe, wherein the effective pipe length is a first distance from the zero reference to the target when the backstop is up against the proximal axial end and the target is up against the distal axial end, and the effective pipe length being substantially equal to the overall length of the threaded pipe minus the specified make-up dimension.

16. The method of claim 15, wherein the certain axial length of the threaded section is greater than the specified make-up dimension.

17. The method of claim 15, wherein the certain axial length of the threaded section is less than the specified make-up dimension.

18. The method of claim 15, wherein the backstop is connected to the ruler such that while adjusting the backstop relative to the laser instrument, the backstop and the ruler move as a unit relative to the laser instrument.

19. The method of claim 15, wherein the threaded section has a peak outer diameter and a root diameter, and the method for tallying pipe further comprising adjusting an adjustable support surface by moving the adjustable support surface relative to the laser instrument, the adjustable support surface engaging the peak outer diameter of the threaded section while being spaced apart from the root diameter.

20. The method of claim 15, wherein the threaded section has a peak outer diameter and a root diameter, and the method for tallying pipe further comprising adjusting an adjustable support surface by moving the adjustable support surface relative to the backstop and moving the adjustable support surface relative to the laser instrument, the adjustable support surface engaging the peak outer diameter of the threaded section while being spaced apart from the root diameter.

* * * * *